307/425 XR 3,461,403

INVENTORS C. K. N. PATEL
N. VAN-TRAN
BY
Wilford L. Wisner
ATTORNEY

MILLIMETER AND FAR INFRARED WAVE GENERATOR

Filed Dec. 13, 1967 3 Sheets-Sheet 3

United States Patent Office 3,461,403
Patented Aug. 12, 1969

3,461,403

MILLIMETER AND FAR INFRARED WAVE GENERATOR

Chandra K. N. Patel, Chatham, and Nguyen Van-Tran, Matawan Township, Monmouth County, N.J., assignors to Bell Telephone Laboratories, Incorporated, Murray Hill, N.J., a corporation of New York Filed Dec. 13, 1967, Ser. No. 690,307
U.S. Cl. 331—107 9 Claims

ABSTRACT OF THE DISCLOSURE

A phase-matched tunable millimeter wave and far infrared wave generator employs semiconductor active media having large bound-electron second-order nonlinear effects but which are not sufficiently birefringent to be phase-matchable by conventional techniques. There is generated a circularly polarized difference-frequency wave for which free carriers (electrons or holes) have the effect of subtracting an appreciable amount from the index of refraction determining its propagation constant. The circularly polarized wave is generated in relatively pure crystals when the frequencies of a pair of input radiations to be mixed and a tuning condition, such as an applied magnetic field, are appropriately selected. Magnetic field tuning is applicable to semiconductors of the cubic class ($\bar{4}3m$). Also, in a parametric oscillator, one radiation is supplied and a second radiation relatively closely spaced in frequency is highly resonated, the frequency of the second radiation and the difference frequency being variable by variation of the magnetic field. The difference frequency is also highly resonated.

Background of the invention

This invention relates to millimeter wave and far infrared wave generators and to devices in which parametric oscillations are produced by bound-electron nonlinearities but are not phase-matchable merely by employing birefringence.

For purposes of this application, millimeter waves are assumed to have wavelengths between about 1 and 10 millimeters and far infrared waves, which are sometimes called sub-millimeter waves, have wavelengths between 10 microns and 1,000 microns, where 1,000 microns equal 1 millimeter. A parametric oscillation is an oscillation in which substantial power is applied at a frequency called the pump frequency, and signal and idler waves, the sum of whose frequencies equals the pump frequency, are generated in an interaction resulting from some nonlinear effect in the crystal. These interactions, called nonlinear interactions hereinafter, occur in a distributed way throughout a substantial bulk of material. The particular interactions employed in practicing our invention are generated by nonlinear responses of bound electrons in relatively pure crystals, even though some of the materials which will be discussed hereinafter can provide even larger nonlinear responses from a plasma of free carriers in less pure, or more highly doped crystals.

Phase-matching is that condition of coincident propagation of pump, signal and idler waves such that there is a continuously predictable phase relationship among all three and a continuously accumulating power transfer from the pump wave to the signal and idler waves throughout an arbitrarily large distance. Typically, this distance is selected to be larger than a coherence length.

A coherence length is the maximum length of material in which the strength of a nonlinear interaction increases in the absence of any special phase-matching between the three waves.

The prior art now includes a fairly large variety of proposals for parametric oscillators. However, these do not necessarily provide output wavelengths in every desired range.

It would be desirable to have improved alternatives for generating parametric oscillations at various millimeter wavelengths and far infrared wavelengths as defined above. Moreover, it would be desirable to have such oscillators which are either mechanically tunable or tunable by the application of an appropriate field.

Summary of the invention

According to our invention, we have recognized that a phase-matched millimeter wave and far infrared parametric generator can employ bound-electron second-order nonlinear effects in suitable semiconductors, pumped by two visible or infrared radiations spaced in frequency by the desired output frequency and tuned by appropriate means so that the difference-frequency wave is generated as a circularly polarized wave. Every linearly polarized wave is the sum of two oppositely-rotating circularly polarized waves. We provide that one of the circularly polarized waves is phase-matched to the two input waves while the other circularly polarized wave is not. The latter wave does not grow; and the phase-matched wave grows and becomes the circularly polarized generated wave.

More broadly, we have recognized that a parametric oscillator can employ the same principles. In this case, only the highest frequency radiation is supplied as the pumping radiation. The active medium is disposed in an optical resonator including reflectors having high reflectivity in two broad bands. The first band includes the frequency which is relatively close to the pumping frequency; and the other band includes the difference frequency. Both of the resonated frequencies can then be varied by variation of the magnetic field.

According to a feature of our invention, we provide tuning that causes one of the circularly polarized difference-frequency waves to experience an effect on its propagation which can be expressed as a subtraction from the index of refraction that would normally determine its propagation constant. Thus, while the propagation constant for the difference-frequency wave would normally be much too large for phase-matching because of normal dispersion, an appropriate choice of a tuning condition can enable generation of a circularly polarized wave that is inherently phase-matched to the input waves.

More specifically, in one embodiment, the tuning condition also includes application of a magnetic field of appropriate magnitude. It is, of course, inherent in our proposal that for appropriate discrete pairs of the closely spaced frequencies and an appropriate concentration of free carriers in the active medium the tuning condition might require zero magnetic field.

According to a subsidiary feature of our invention, the two input waves are supplied from a high power laser having at least two transitions closely spaced in frequency or from two separate lasers or two separate parametric oscillators providing two waves of a selected frequency spacing. In each case, the two input waves must be spaced in frequency by the desired millimeter wave or far infrared frequency and must be substantially phase-related. Examples of such sources are a carbon dioxide laser operating simultaneously on two vibrational-rotational transitions, the particular two transitions employed being chosen through selection of appropriate operating conditions, or two tunable lithium niobate parametric oscillators. Another example includes two tunable selenium backward wave oscillators.

Examples of the active media are cubic semiconductors of class ($\bar{4}3m$), for example, indium antimonide and indium arsenide.

According to another aspect of our invention, we have recognized that the efficiency with which two linearly polarized input waves can generate a circularly polarized difference-frequency wave depends in part on lack of growth of the difference-frequency wave of the opposite circular polarization. Accordingly, in certain instances, it may be desirable to circularly polarize both input waves so that only the desired circular polarization of the difference-frequency wave can be generated in the first instance. Phase-matching can still be obtained because the two input waves are of such high frequency that the indices of refraction determining their propagation constants are not significantly affected by the presence of the free carriers.

Brief description of the drawing

Further features and advantages of our invention will become apparent from the following detailed description, taken together with the drawing, in which.

Description of illustrative embodiments

Figure 1:
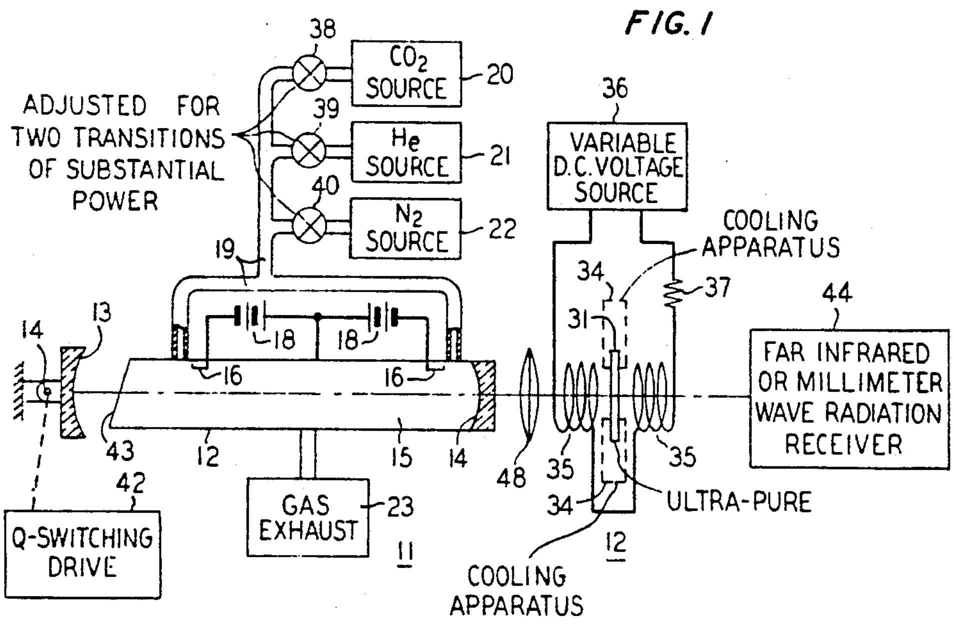
FIG. 1 is a partially pictorial and partially schematic illustration of a first embodiment of the invention.

In FIG. 1, the carbon dioxide laser 11 is the source of two phase-related coherent optical radiations from vibrational-rotational transitions of carbon dioxide. The laser 11 includes a cylindrical glass or Pyrex tube 12 which contains the gas mixture in which excitation occurs, the partially transmissive reflector 14 forming one end of the optical resonator and of the tube 12, and the rotatable reflector 13 which is disposed outside of the opposite transparent Brewster angle end face 43 of the tube 12. The rotatable reflector 13 is mounted upon a support 41, which permits its rotation. The reflector 13 is rotated by Q-switching drive 42, which could be a suitable servo motor or other means. The transparent face plate 43 of tube 12 is illustratively potassium chloride. The laser 11 further includes a means 19 for flowing the carbon dioxide, helium and nitrogen gases from sources 20, 21 and 22 into the tube 12 and includes means 23 for exhausting the spent gases from the tube. The proportions of these gases in the tube are controlled by a suitable adjustment of valves 38, 39 and 40, respectively, in order to promote oscillation of two neighboring vibrational-rotational transitions of the carbon dioxide, preferably at wavelengths around 10.6 microns. The laser 11 further includes means for exciting the gas mixture to enable the stimulated emission of radiation; the excitation means includes DC voltage sources 18, the anode 17 and the cathodes 16.

The output radiations of the laser 11 are focused by a lens 48 upon the active medium 31 of the far infrared or millimeter wave generator. The medium 31 is illustratively a crystalline body, such as a single crystal, of indium antimonide (InSb) having a free charge concentration of less than $10^{14}$ per cubic centimeter. The generator further includes means 34 for cooling the medium 31, illustratively a conventional cryogenic cooling apparatus including cold fingers disposed upon the medium 31. The generator also includes means for tuning the parametric interaction, including the Helmholtz coil 35, halves of which are disposed on opposite sides of medium 31 along the direction of propagation of the incident light. The generator includes the variable DC voltage source 36 which is connected to coil 35 through a current-limiting resistor 37. The output circularly polarized difference-frequency wave from the medium 31 is received by a receiver 44 suitable for the particular difference frequency that is generated in the medium 31. For example, the receiver 44 might include a crystal, the properties of which are being studied with the aid of the tunable radiation, together with a suitable radiation detector. The radiation detector could include a waveguide section with suitable crystal detector therein and an absorbing termination. Alternatively, the detector could be a spectrograph or an infrared photoconductive diode detector.

Typical operating parameters of the embodiment of FIG. 1 are as follows: The carbon dioxide, helium and nitrogen in laser 11 are in proportions of 1:10:1, respectively, and provide lasing action on two vibrational-rotational transitions separated in frequency by 56 gHz. (one gigahertz equals $10^9$ cycles per second). The Q-switching rate is illustratively 400 pulses per second. Nevertheless, it should be understood that laser 11 could be operated in a continuous-wave manner, without pulsing. The magnetic field supplied by coil 35 is illustratively 20K oe. The peak pulse powers of the two input radiations lie in the range between 0.5 kilowatt and 35 kilowatts and the lens 48 focuses them to an area of approximately $10^{-2}$ square centimeters in medium 31.

In the operation of the embodiment of FIG. 1, there is no minimum threshold for parametric mixing. Two input waves excite a second-order nonlinear effect of bound electrons in the indium antimonide in medium 31. Consequently, a difference frequency at 56 gHz. is generated.

The manner in which this difference-frequency wave becomes circularly polarized can be explained as follows: We first define right-hand circular polarization as being positive and as being in the direction opposite to the direction of electron cyclotron motion in the applied magnetic field. Accordingly, left-hand circular polarization would be negative and its direction of rotation would be in the same direction as the electron cyclotron motion of the field. Let the propagation constants of the right-hand and left-hand circularly polarized components of the difference-frequency wave be defined by $k_+$ and $k_-$, respectively.

$$k_+=\omega_3 n_+/c \qquad (1)$$

where $\omega_3$ is the angular frequency of the difference-frequency wave, $n_+$ is the effective index of refraction for the right-hand circularly polarized wave, and $c$ is the velocity of light. Similarly, $$k_-=\omega_3 n_-/c \qquad (2)$$

where $n_-$ is effective index of refraction for the left-hand circularly polarized wave. It remains to explain how one of these effective indices of refraction can be sufficiently lower than the usual low-frequency index of refraction so that the effect of dispersion is offset and phase-matching is made possible. From the intuitive viewpoint, we can view the effect as being an interaction between the electrons undergoing cyclotron motion and the rotating electric field vector of the circularly polarized wave. One can appreciate that, at sufficiently low frequencies, there would be substantial exchange of energy. Nevertheless, it is important for obtaining a useful output that $\omega_3$ not be too close to the cyclotron resonance frequency $\omega c$. Specifically, $$|\omega_3-\omega_c|\tau\gg 1 \quad (3)$$

where $\tau$ is the relaxation time, or average time between collisions for an individual free electron, and the double inequality sign implies that the left-hand side of the inequality is much larger, at least one order of magnitude larger, than unity. Moreover, for the medium to be lossless, $$\omega_3\ll\omega_{TO} \quad (4)$$

where $\omega_{TO}$ is the frequency of the transverse optical phonon. $\omega_3$ should be substantially different than the plasma frequency, $\omega_P$, where the plasma frequency is defined as follows:

$$\omega_P=\sqrt{Ne^2/m^*\epsilon_0} \quad (5)$$

where N is the charge carrier concentration per cubic centimeter, $e$ is the charge of an electron, $\epsilon_0$ is the low-frequency dielectric constant of the medium, and $m^*$ is the mass of a free electron in the solid medium 31. The techniques for determining the frequency of the transverse optical phonon and the cyclotron resonance frequency are well known and will not be set out in detail here.

It suffices to say that all of the foregoing conditions can be satisfied for purposes of our invention by employing, in the embodiment of FIG. 1, relatively pure crystals having charge carrier concentrations less than $10^{14}$ per cubic centimeter and applying either relatively weak magnetic fields, such that $\omega_c\ll\omega_3$, or such strong magnetic fields that the inequality of Equation 3 is satisfied by virtue of $\omega_c\gg\omega_3$. Moreover, the above-described conditions are readily satisfied with these concentrations and cyclotron frequencies if crystals of the cubic class ($\bar{4}3$m) are employed in the embodiment of FIG. 1. Indium antimonide is such a crystal; so are indium arsenide, gallium arsenide, and gallium phosphide. Other members of this class of materials are also well known. It can be shown that the dielectric constants $\epsilon_+$ and $\epsilon_-$ corresponding to the indices of refraction $n_+$ and $n_-$ are given as follows:

$$\epsilon_+(\omega_3)=\epsilon(\infty)+\frac{\delta}{\omega_{TO}^2-\omega_3}-\frac{\omega_P^2(\omega_3+\omega_c)\tau^2}{\omega_3[1+(\omega_3\omega_c)^2\tau^2]} \quad (6)$$

$$\epsilon_-(\omega_3)=\epsilon(\infty)+\frac{\delta}{\omega_{TO}^2-\omega_3^2}-\frac{\omega_P^2(\omega_3-\omega_c)\tau^2}{\omega_3[1+(\omega_3-\omega_c)^2\tau^2]} \quad (7)$$

where $\delta$ is a constant depending upon the material. The corresponding effective indices of refraction are the square roots of these quantities. Several facts may be noted from the above equations. First, the effective index of refraction for the two input waves is essentially the same as that at infinite frequency and is given by the first term on the right-hand side of each of the above equations. Secondly, the second terms on the right-hand side of the above equations represent normal dispersion from infinite frequency to frequency $\omega_3$. Finally, the last terms on the right-hand sides of the above equations represent the effects of free carriers upon circularly polarized components of waves at frequency $\omega_3$. The size and sign of the last terms is determinative of the ability to phase-match, but should also be associated with relatively low losses for all three waves in order to be useful. For the condition in which $\omega_c\gg\omega_3$ (large magnetic fields), the last term in Equation 7 becomes additive instead of subtractive, so that the left-hand circularly polarized wave cannot be used for the purposes of the present invention. For the case in which $\omega_c\ll\omega_3$ (small magnetic fields), either the left-hand circularly polarized wave or the right-hand circularly polarized wave can be phase-matched to the input waves; but the phase-matching condition is extremely sensitive to small variations in the relatively small magnetic field. Such precise adjustment may be of interest for scientific experiments and for parametric oscillators as described hereinafter with reference to FIG. 4. For parametric mixers such as those of FIGS. 1–3, it will generally be preferable to employ tuning such that $\omega_c\gg\omega_3$ and adjust the field so that the right-hand circularly polarized wave is phase-matched. In this case, Equation 6 is the applicable equation. It is the latter case, employing relatively large magnetic fields, which has been illustratively described for the embodiment of FIG. 1.

Therefore, for the adjustment of parameters given above, receiver 44 will receive a circularly polarized difference-frequency wave at 56 gHz., the sense of the circular polarization being opposite to the direction of cyclotron motion in medium 31. Our calculations show that the absorption coefficient for the generated difference-frequency wave is in a range which makes the operation of the device feasible and that the generated power will be of the order of 250 milliwatts per square centimeter of cross section of the interaction in the medium 31.

Figure 2:
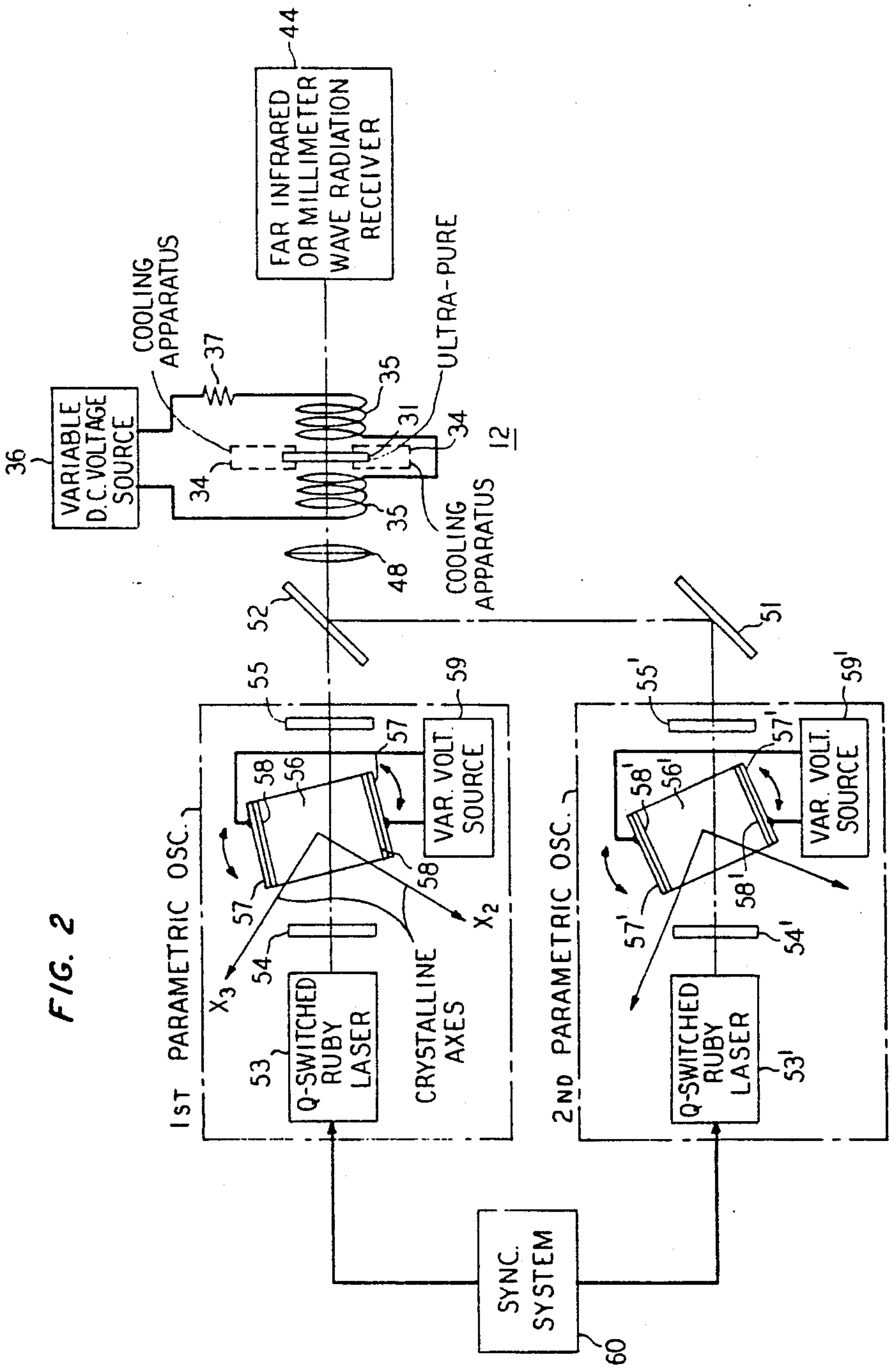
FIG. 2 is a partially pictorial and partially schematic illustration of a second embodiment of the invention in which two parametric oscillators are used as sources of the two input waves for the millimeter wave or far infrared wave generator.

In the embodiment of FIG. 2, the generator is adapted primarily for the purpose of generating millimeter waves of relatively low frequency compared to the difference-frequency waves of the embodiment of FIG. 1. This is done by supplying the input waves from two different sources so that the input waves can be tuned to be arbitrarily close in frequency. Each of the sources in the embodiment of FIG. 2 is a lithium niobate parametric oscillator. The output from the lower parametric oscillator is directed into medium 31 by means of the 45° reflector 51 and the fifty percent reflective 45° reflector 52, which is disposed between the first parametric oscillator and the lens 48. The output of the first parametric oscillator is admitted to the medium 31 by partial transmission through the fifty percent transmissive reflector 52. The two parametric oscillators include, respectively, the Q-switched lasers 53 and 53', optical resonators including multiple layer dielectric mirrors 54 and 55 in the first oscillator and 54' and 55' in the second oscillator, and respective nonlinear active media in the optical resonators. Specificially, these active media are the lithium niobate crystals 56 and 56', respectively. Electrodes 57 and 57' are employed for the application for the tuning electric field and are separated from the crystals 56 and 56', respectively, by Teflon® spacers 58 and 58'. The tuning of the parametric oscillators is further facilitated by mounting the crystals 56 and 56' so that they can be rotated about an axis orthogonal to the indicated crystalline axes $X_2$ and $X_3$. It will be seen that the angular orientations of crystals 56 and 56' differ slightly. The electrodes 57 are connected to opposite terminals of a variable voltage source 59; and the electrodes 57' are connected between opposite terminals of a variable voltage source 59'. Illustratively, the crystals 56 and 56' are 0.7 centimeter long and are oriented so that the pump waves from lasers 53 and 53' are extraordinary waves with wave normals in the $X_2X_3$ plane at angles between 0° and 50° with respect to the optic axis. The Q-switched lasers 53 and 53' are coupled together by a synchronization system 60, which illustratively includes suitable reflectors and prisms (not shown) adapted to direct beams from one to the other. Further adjustments of the parametric oscillators are considered to be within the present state of the art in view of such articles as that of L. B. Kreuzer, "Ruby-Laser-Pumped Optical Parametric Oscillator with Electrooptic Effect Tuning" in Applied Physics Letters, volume 10, page 336, June 15, 1967.

In operation, the tunable parametric oscillators of FIG. 2 illustratively generate waves having frequencies separated by a desired millimeter-wave frequency. To achieve this frequency separation, one could employ both of the signal waves from the parametric oscillator or both of the idler waves. Which is used would be selected by suitable filters (not shown) following reflectors 55 and 55'. Let us assume that the idler waves are used and that these both have wavelengths of near 2 microns. Receiver 44 remains the same as in the embodiment of FIG. 1.

The frequency of the generated difference-frequency wave can be varied by simultaneously rotating crystals 56 and 56' through appropriate small angles and simultaneously changing the field applied to medium 31 by coil 35. The sense of the variation can be determined from Equation 6.

Figure 3:
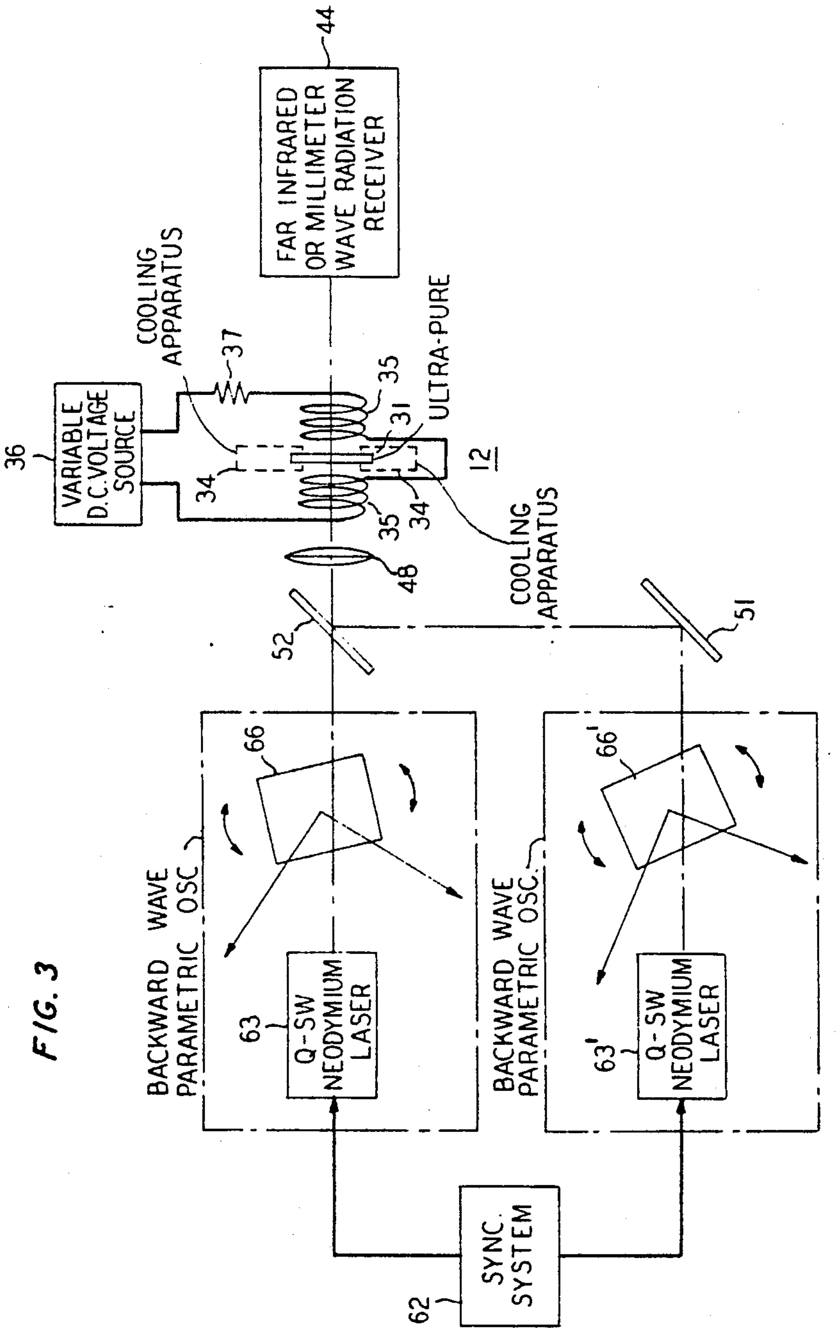
FIG. 3 is a partially pictorial and partially block diagrammatic illustration of a third embodiment of the invention in which two backward wave oscillators are used as the sources of the two input waves.

In FIG. 3, the generator configuration is similar to that of FIGS. 1 and 2. This embodiment differs in that the parametric oscillators are selenium backward wave oscillators that do not require an optical resonator. The selenium crystals 66 and 66' are mounted for rotation about an axis orthogonal to and are pumped by Q-switched neodymium lasers 63 and 63' operating at 1.06 microns.

In this embodiment, one employs output idler frequencies from the two parametric oscillators, since the signal waves propagate in the backward direction toward lasers 63 and 63'. The idler frequencies are spaced by the desired millimeter-wave frequency. Further details of the adjustment of such selenium backward wave oscillators may be found in the article by S. E. Harris, "Proposed Backward Wave Oscillation in the Infrared," Applied Physics Letters, volume 9, page 114, Aug. 1, 1966.

The wave generators described above can be called mixers because two input waves are supplied.

In some circumstances, greater flexibility in tuning can be achieved in a parametric oscillator. In this case, a single input radiation is supplied; and the device is arranged so that the threshold for parametric oscillations is exceeded.

Figure 4:
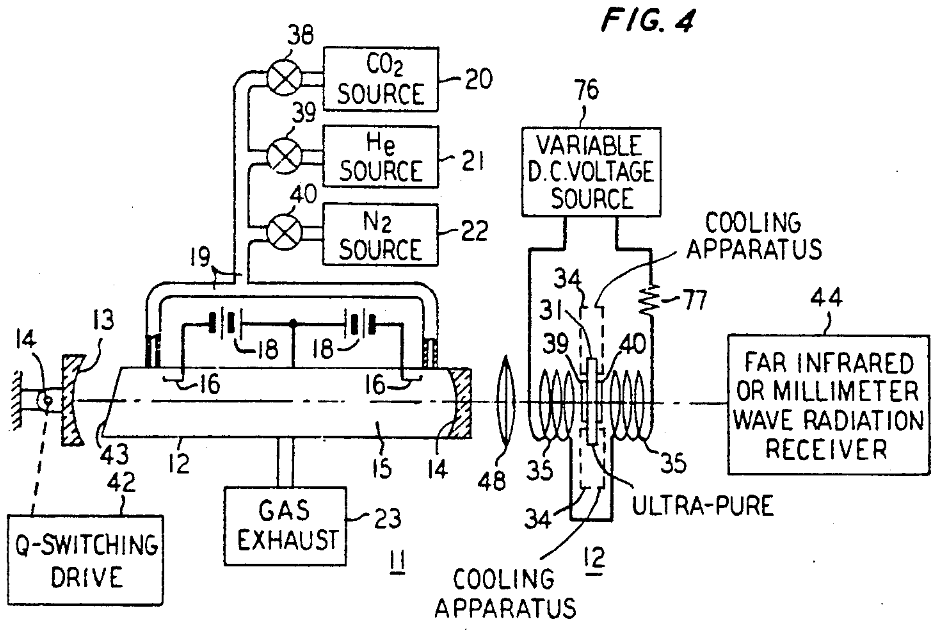
FIG. 4 is a partially pictorial and partially block diagrammatic illustration of a fourth embodiment of the invention employed as a parametric oscillator.

A tunable parametric oscillator of this type is illustrated in FIG. 4. This embodiment differs from the embodiment of FIG. 1 in the following respects.

First, pumping radiation of essentially only a single frequency is supplied from the laser 11. Thus, the laser is adjusted to operate on only one transition, for example, by adjusting the gas mixture.

Second, the body 31 is provided with an optical resonator comprising reflectors 39 and 40, which are placed on body 31 on the faces orthogonal to the common direction of propagation of the radiations. Reflectors 39 and 40 each include multiple dielectric coatings adapted to be more than 90 percent reflective in a first band beginning at a frequency just below the pump frequency and ending at a frequency above any of the characteristic far infrared absorption frequencies of body 31. The reflectors 39 and 40 are designed also to be highly reflective in a second frequency band, equal in breadth to the first, beginning at a frequency of 3 gigahertz (kilomegacycles per second) and extending into the far infrared, but well short of the absorption frequencies. Such double-peaked and relatively broadband multiple dielectric reflectors are now well known in the art.

Third, the voltage of source 76 is adjusted to supply current through coil 35 such that the applied magnetic field is in the range for which $\omega_c < \omega_3$, where $\omega_c$ is the cyclotron resonance frequency and $\omega_3$ is the desired far infrared or millimeter wave difference frequency. Illustratively, this field could be 5K oe.

The operation of the embodiment of FIG. 4 differs from the embodiment of FIG. 1 in the respect that the left-hand circularly polarized wave at frequency $\omega_3$ is now phase-matched to the pumping radiation and to a highly resonated radiation of frequency relatively close to the frequency of the pumping radiation. This left-hand circularly polarized wave has propagation constant $k_-$, as determined from Equation 7 above.

Moreover, in this embodiment, the rapid variation of the frequencies of the two generated waves as the relatively small magnetic field is varied is highly desirable. This tuning sensitivity or rapid variation was explained above for phase-matching to the left-hand circularly polarized wave. It provides a lower threshold for parametric oscillation than for the right-hand circularly polarized wave.

We claim:

1. A device comprising
   a crystalline body of semiconductive material characterized by a substantial second-order nonlinear coefficient describing responses of bound electrons, said body having a concentration of free carriers less than $1\times10^{14}$ per cubic centimeter,
   means for supplying first and second phase-related waves of coherent optical radiation to said body to propagate collinearly therethrough, said two waves having a difference frequency less than $3\times10^{12}$ cycles per second, and substantially different from the plasma frequency and the frequency of the transverse optical phonon in said body, and
   means for tuning said device to provide a free carrier subtraction from the index of refraction in said crystal for a circularly polarized wave generated at said difference frequency, said tuning means being adjusted to provide phase-matched propagation of all of said waves.

2. A device according to claim 1 in which the crystalline body is a body of semiconductive material of cubic class ($\bar{4}3m$), the means for tuning the device comprises means for applying a magnetic field having variable magnitude to said body collinearly with the supplied waves, and the means for supplying the first and second phase-related waves includes means for varying the frequency spacing of said waves to facilitate the tuning.

3. A device according to claim 2 in which the magnetic field applying means applies a magnetic field of magnitude providing a cyclotron frequency of free carriers that is more than an order of magnitude greater than the difference frequency of the supplied waves.

4. A device according to claim 2 in which the means for supplying first and second phase-related waves comprises a gas laser including multiple gases and operating upon first and second vibrational-rotational transition of one of the gases, the means for varying the frequency spacing including means for separately varying the amounts of each of said gases in said laser.

5. A device according to claim 2 in which the means for supplying two phase-related waves comprises first and second parametric oscillators supplying the first and second waves, respectively, and including respective means for tuning the frequency of said first and second waves, said supplying means including means for directing said waves to propagate collinearly through the crystalline body.

6. A device according to claim 5 in which the first and second parametric oscillators are backward wave oscillators including respective bulk nonlinear optical media possessing birefringence of magnitude sufficient for backward propagation of a wave in a nonlinear interaction in each of said media.

7. A device comprising
   a crystalline body of semiconductive material characterized by a substantial second-order nonlinear coefficient describing responses of bound electrons, said body having a concentration of free carriers less than $1\times10^{14}$ per cubic centimeter,
   means for supplying a first wave of coherent optical radiation to said body to propagate therethrough,
   an optical resonator comprising reflector disposed about said body and characterized by substantial reflectivity at the frequency of a second wave of coherent radiation that can be generated from said first wave in said body, said resonator being characterized by substantial reflectivity at a third frequency that is the difference between the frequencies of the first and second waves and is less than $3\times10^{12}$ cycles per second, and
   means for tuning said device to provide a free carrier subtraction from the index of refraction in said crystal for a circularly polarized wave generated at said difference frequency, said tuning means being adjusted to provide phase-matched propagation of all of said waves.

8. A device according to claim 7 in which the means for tuning the device comprises means for applying a magnetic field having variable magnitude to said body collinearly with the first and second waves.

9. A device according to claim 8 in which the magnetic field applying means applies a magnetic field of magnitude providing a cyclotron frequency that is more than an order of magnitude less than the difference frequency of the first and second waves.

References Cited

UNITED STATES PATENTS 3,267,385 8/1966 Ashkin ------------- 330—4.6

ROY LAKE, Primary Examiner

DARWIN R. HOSTETTER, Assistant Examiner

U.S. Cl. X.R.

307—88; 330—4; 331—177